Nov. 19, 1935. J. HOCHSTADT 2,021,784
VEHICULAR PROPULSION MEANS
Filed Aug. 9, 1934
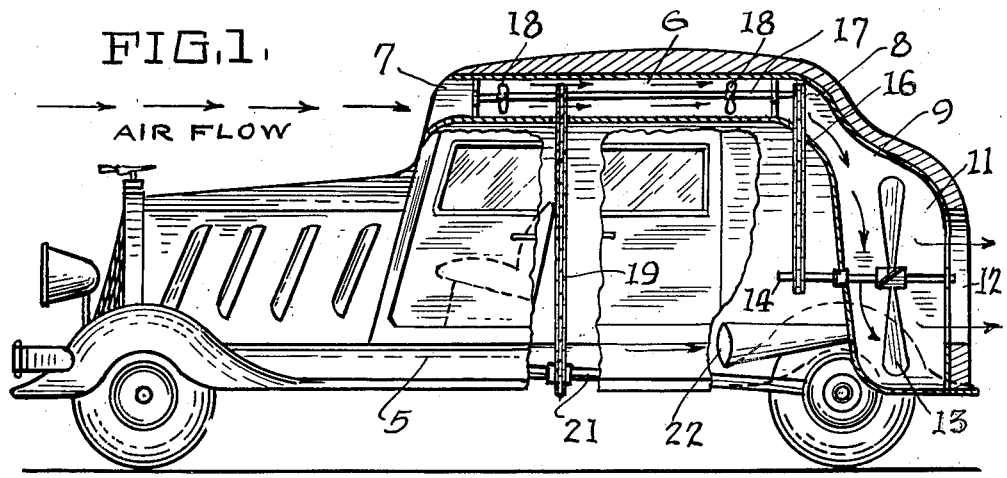
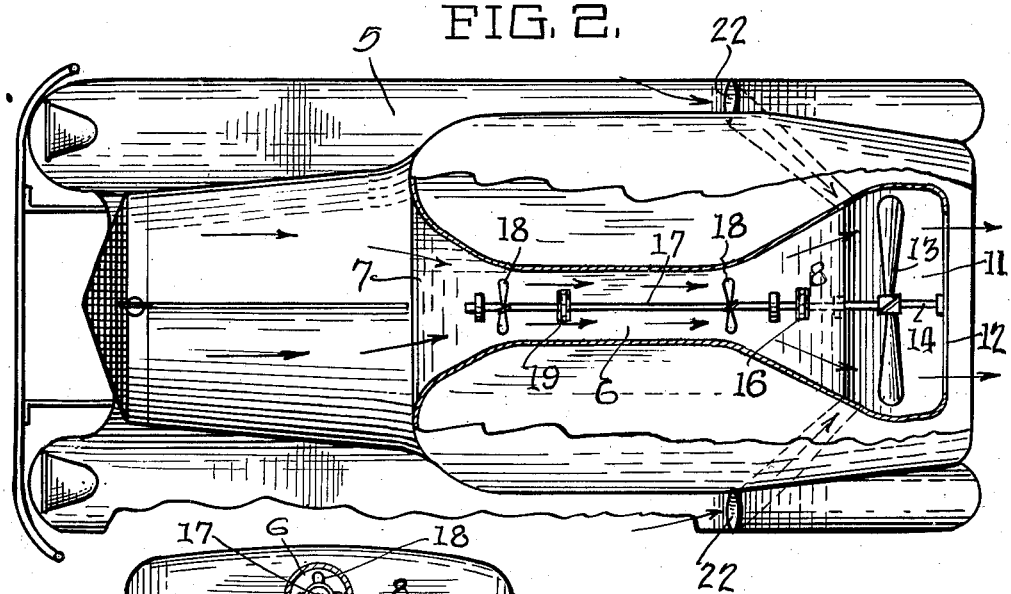
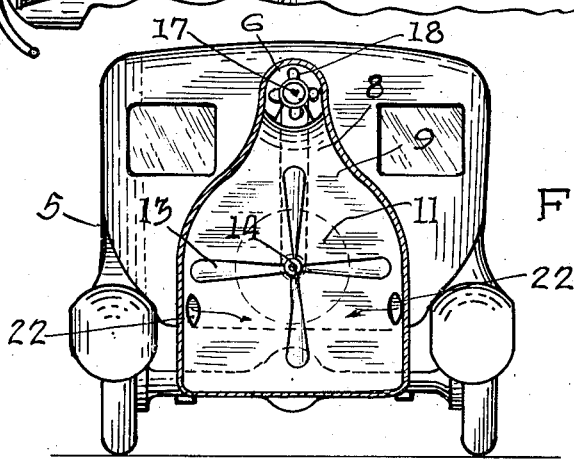
INVENTOR.
JACK HOCHSTADT.
BY
ATTORNEYS.

Patented Nov. 19, 1935

2,021,784

UNITED STATES PATENT OFFICE 2,021,784

VEHICULAR PROPULSION MEANS

Jack Hochstadt, San Francisco, Calif.

Application August 9, 1934, Serial No. 739,180

1 Claim. (Cl. 180—1)

This invention relates to improvements in vehicular propulsion means and has particular reference to a means for cutting down the wind resistance incident to travelling at high speeds and to employ this wind resistance as a motive power to further assist the propulsion of the vehicle.

A further object is to produce a device of this character which will cut the fuel consumption to a very marked extent.

Another object is to produce a device of this character which may be installed in the ordinary vehicle such as an automobile, without adding greatly to its cost.

A further object is to produce a device which will be fully housed and, therefore, one which will present a neat appearance.

A still further object is to produce a device which is quiet in operation and therefore not objectionable to the driver or occupants of the vehicle.

Other objects and advantages will be apparend during the course of the following description.

In the accompanying drawing forming a part of this specification and in which like numerals are employed to designate like parts throughout the same, Fig. 1 is a side elevation of a motor vehicle constructed in accordance with my invention, a portion thereof being broken away to show the operative mechanism, Fig. 2 is a top plan view of Fig. 1, and Fig. 3 is a rear elevation showing the propeller housing in cross section.

It is a well known fact that air resistance of a vehicle moving over a highway increases very rapidly with the increasing speed of the vehicle. Therefore, it is my intention to provide some means for eliminating this excessive wind pressure which acts as a braking force and therefore requires more fuel to overcome. In accomplishing this object I propose to suck this air, which is opposing the movement of the vehicle, through a suitable duct and to then deliver this air from the back of the vehicle with considerable force so that this air will become a propulsive force to assist the engine of the vehicle.

In the accompanying drawing wherein for the purpose of illustration is shown a preferred embodiment of my invention, the numeral 5 designates an ordinary motor vehicle which to all intents and purposes is similar to the usual motor car now found upon the market, the difference being that upon the top of the vehicle I form a duct 6 which has a funnel-shaped opening 7 at its forward end. At its rear end this duct is flared as shown at 8 and communicates with a downwardly extending neck 9 which in turn communicates with a chamber 11, which is opened as at 12 to the rear of the vehicle. Within this chamber 11 is positioned a propeller 13 which is mounted upon a shaft 14, driven by a chain 16 extending from the shaft 14 to the shaft 17. It is of course obvious that sprockets are positioned upon each of the shafts. The shaft 17 is rotatably supported in the duct 6 and has a pair of propellers 18 secured thereto. A chain or shaft 19 extends from the shaft 17 to the propeller shaft 21. Ducts 22 extend from a point adjacent the forward end of the rear fenders to a point adjacent the fan 13. As a result, air may flow as indicated by the arrows upon the running board of Fig. 2 and will enter the chamber 11 as indicated by the arrows of Fig. 3. The airflow through the duct 6 is indicated by the arrows of Fig. 1. It is, of course, obvious that any desired clutching mechanism may be employed to drive or disconnect power transmission between the propeller shaft 21 and shaft 17.

The result of this construction is that when the vehicle is moving over the highway and my device is in use, the air which would normally bank up or be compressed in front of the vehicle will be withdrawn from that point and will be forced through the duct 6 and out of the rear of the chamber 11. This travel of the air will be assisted by the propellers 18 and 13. Consequently I have not only moved the pressure from in front of the vehicle but I have destroyed the vacuum which ordinarily takes place back of the vehicle.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention; I claim:—

In a device of the character described, the combination with a motor vehicle having a duct formed thereon of less width than the width of the motor vehicle, said duct having a funnel-shaped opening extending in the direction of travel of the vehicle, the mouth of said funnel being substantially the width of the top of the motor vehicle, said duct having a flared rear end and a vertically positioned chamber connected with said duct and extending downwardly along the back of said vehicle and forming a chamber, said chamber communicating with the atmosphere to the rear of the vehicle, whereby air passing through said duct will move from said chamber in a horizontal direction to the rear of said vehicle, means positioned in said chamber for exhausting air therefrom, said means including a power driven propeller, and side ducts extending to a point adjacent the forward end of the rear fenders and communicating with said chamber.

JACK HOCHSTADT.